United States Patent
Chen et al.

(10) Patent No.: US 10,788,850 B2
(45) Date of Patent: *Sep. 29, 2020

(54) SYSTEM AND METHOD OF BALANCING OUTPUT CURRENTS OF A PLURALITY OF POWER SUPPLY UNITS FOR SUPPLYING POWER TO A SYSTEM LOAD

(71) Applicant: EMC IP Holding Company LLC, Hopkinton, MA (US)

(72) Inventors: Sean Xu Chen, Shanghai (CN); Jesse Xizhi Cui, Shanghai (CN); Tao Yang, Shanghai (CN); Haifang Zhai, Shanghai (CN); Alice Aiqin Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,625

(22) Filed: Jun. 11, 2019

(65) Prior Publication Data
US 2019/0294192 A1    Sep. 26, 2019

Related U.S. Application Data

(63) Continuation of application No. 15/955,117, filed on Apr. 17, 2018, now Pat. No. 10,423,183.

(30) Foreign Application Priority Data

Apr. 17, 2017   (CN) .......................... 2017 1 0249895

(51) Int. Cl.
| | | |
|---|---|---|
| *G05F 1/625* | (2006.01) | |
| *G05F 1/66* | (2006.01) | |
| *G06F 1/30* | (2006.01) | |
| *G06F 1/28* | (2006.01) | |
| *H02M 7/155* | (2006.01) | |
| *H02M 7/483* | (2007.01) | |
| *H02J 7/00* | (2006.01) | |
| *H02J 1/10* | (2006.01) | |

(52) U.S. Cl.
CPC ................ *G05F 1/625* (2013.01); *G05F 1/66* (2013.01); *G06F 1/28* (2013.01); *G06F 1/305* (2013.01);
(Continued)

(58) Field of Classification Search
CPC ....... H02M 7/1557; H02M 7/483; G05F 1/66; G05F 1/625; G06F 1/28; G06F 1/305;
(Continued)

(56) References Cited

U.S. PATENT DOCUMENTS

| | | |
|---|---|---|
| 5,959,443 A | 9/1999 | Littlefield |
| 6,356,057 B1 | 3/2002 | Shilo et al. |

(Continued)

*Primary Examiner* — Thienvu V Tran
*Assistant Examiner* — Nusrat Quddus
(74) *Attorney, Agent, or Firm* — BainwoodHuang (57) ABSTRACT

Embodiments of the present disclosure relates to a method and device for balancing a supply current. In one embodiment, a current supply current for a load is detected. A first signal representing the current supply current is transmitted to a digital logic module. A second signal representing a maximum supply current and a third signal representing a minimum supply current are received from the digital logic module. A subsequent supply current for the load is determined based on the current supply current, the maximum supply current and the minimum supply current. By using the method and device according to the embodiments of the present disclosure, the supply currents of a plurality of power supply units for the load can be balanced a simple way with a low hardware cost.

20 Claims, 6 Drawing Sheets

(52) U.S. Cl.
CPC . *H02J 1/10* (2013.01); *H02J 7/00* (2013.01); *H02J 7/0063* (2013.01); *H02J 2007/0067* (2013.01); *H02J 2207/20* (2020.01); *H02M 7/1557* (2013.01); *H02M 7/483* (2013.01)

(58) Field of Classification Search
CPC .......... H02J 7/0063; H02J 7/0065; H02J 7/00; H02J 1/10; H02J 2007/0067
See application file for complete search history.

(56) References Cited

U.S. PATENT DOCUMENTS

| | | |
|---|---|---|
| 6,470,084 B1 | 10/2002 | Van Zanten |
| 6,873,140 B2 | 3/2005 | Saggini et al. |
| 6,904,541 B1 | 6/2005 | MacArthur et al. |
| 7,323,828 B2 | 1/2008 | Russell et al. |
| 7,372,693 B1 | 5/2008 | Feroli et al. |
| 7,656,141 B1 | 2/2010 | Granat |
| 7,830,770 B1 | 11/2010 | Linnell |
| 7,893,678 B2 | 2/2011 | Blanken |
| 8,456,128 B2 | 6/2013 | Fotherby |
| 8,729,870 B2 | 5/2014 | Crawford et al. |
| 9,244,473 B2 * | 1/2016 | Young ....................... G05F 1/12 |
| 9,485,655 B1 | 11/2016 | Pirrotta |
| 9,887,624 B2 | 2/2018 | Hofmann et al. |
| 9,900,942 B1 | 2/2018 | Eggermont |
| 10,033,267 B2 | 7/2018 | Rinne et al. |
| 2006/0071639 A1 | 4/2006 | Ross et al. |
| 2014/0159689 A1 | 6/2014 | Chen |

* cited by examiner

SYSTEM AND METHOD OF BALANCING OUTPUT CURRENTS OF A PLURALITY OF POWER SUPPLY UNITS FOR SUPPLYING POWER TO A SYSTEM LOAD

RELATED APPLICATIONS

This application is a continuation of U.S. patent application Ser. No. 15/955,117 filed Apr. 17, 2018 entitled METHOD OF BALANCING A SUPPLY CURRENT AND DEVICE FOR SUPPLYING POWER, which claims benefit of the priority of Chinese Patent Application No. CN201710249895.6 filed Apr. 17, 2017 entitled METHOD FOR BALANCING SUPPLIED CURRENTS AND APPARATUS FOR SUPPLYING POWER.

FIELD

Embodiments of the present disclosure relate to power supply technologies, and more specifically, to a method of balancing a supply current and a device for supplying power.

BACKGROUND

In an electronic device, such as a data storage device and the like, a plurality of power supply units are often used to supply power to the electronic device in need of massive power consumption. For a plurality of power supply units, there exists a situation that the supply currents of the power supply units are unbalanced. Therefore, the output power of a certain power supply unit may exceed its maximum rated output current, which can easily reduce the service life of the power supply unit. In a more severe situation, it may cause a power supply unit failure. Thus, the supply currents of the plurality of power supply units need to be balanced.

SUMMARY

In general, example embodiments of the present disclosure relates to a method of balancing a supply current and a device for supplying power.

According to a first aspect of the present disclosure, a method of balancing a supply current includes transmitting, to a digital logic circuit, a first signal representing a first supply current for a load, and receiving, from the digital logic circuit, a second signal representing an average supply current. The average supply current is an average of the first supply current and at least one second supply current for the load. The method further includes obtaining a subsequent supply current for the load based on the first supply current and the average supply current.

In some embodiments, the obtaining of the subsequent supply current includes obtaining a difference between the first supply current and the average supply current, and obtaining the subsequent supply current based on the difference.

In some embodiments, the obtaining of the subsequent supply current includes, in response to the difference being less than a predetermined threshold, maintaining the first supply current as the subsequent supply current.

In some embodiments, the obtaining of the subsequent supply current includes, in response to the difference being greater than a predetermined threshold and the average supply current being greater than the first supply current, increasing the first supply current by a predetermined current amount, and using the increased first supply current as the subsequent supply current.

In some embodiments, the increasing of the first supply current by the predetermined current amount includes increasing an output voltage for the load by a predetermined voltage amount.

In some embodiments, the obtaining of the subsequent supply current includes, in response to the difference being greater than a predetermined threshold and the average supply current being less than the first supply current, decreasing the first supply current by a predetermined current amount, and using the decreased first supply current as the subsequent supply current.

In some embodiments, the decreasing of the first supply current by the predetermined current amount includes decreasing an output voltage for the load by a predetermined voltage amount.

According to a second aspect of the present disclosure, a device for supplying power includes a power output circuit configured to output a first supply current to a load, a current sensing circuit configured to sense the first supply current, and a microprocessor. The microprocessor is configured to transmit a first signal representing the first supply current to a digital logic circuit, and to receive, from the digital logic circuit, a second signal representing an average supply current. The average supply current is an average of the first supply current and at least one second supply current for the load. The microprocessor is further configured to obtain a subsequent supply current for the load based on the first supply current and the average supply current.

According to a third aspect of the present disclosure, a power source includes a plurality of devices for supplying power and a digital logic circuit. The digital logic circuit is configured to receive a first supply current and at least one second supply current for a load, to determine an average supply current based on the first and second supply currents for the load, and to transmit a signal representing the average supply current to the plurality of devices.

According to a fourth aspect of the present disclosure, a method of balancing a supply current includes transmitting, to a digital logic circuit, a first signal representing a first supply current for a load, and receiving, from the digital logic circuit, a second signal representing a median supply current. The median supply current is a median of the first supply current and a plurality of second supply currents for the load. The method further includes obtaining a subsequent supply current for the load based on the first supply current and the median supply current.

It should be understood that the Summary does not intend to identify key or essential features of the embodiments of the present disclosure, nor is it intended to limit the scope of the present disclosure. Other features of the present disclosure will become easier to understand through the description below.

BRIEF DESCRIPTION OF THE DRAWINGS

Through a more detailed description of some embodiments of the present disclosure in the accompanying drawings, the above and other advantages, features, and objects of the present disclosure will become more apparent, in which.

Throughout the drawings, same or similar reference signs refer to same or similar elements.

DETAILED DESCRIPTION

The disclosures of U.S. patent application Ser. No. 15/955,117 filed Apr. 17, 2018 entitled METHOD OF BALANCING A SUPPLY CURRENT AND DEVICE FOR SUPPLYING POWER, and Chinese Patent Application No. CN201710249895.6 filed Apr. 17, 2017 entitled METHOD FOR BALANCING SUPPLIED CURRENTS AND APPARATUS FOR SUPPLYING POWER, are hereby incorporated herein by reference in their entirety.

The principles of the present disclosure are now described with reference to some example embodiments. It can be appreciated that those embodiments are described only for the purpose of illustrating and assisting those skilled in the art to understand and implement the present disclosure, but are not intended for limiting the scope of the present disclosure in any manner. The contents of the present disclosure described herein can be implemented by various ways except the ways described below.

As used herein, the term "includes" and its variants are to be read as open-ended terms which mean "includes, but is not limited to." The term "based on" is to be read as "based at least in part on." The term "one embodiment" is to be read as "at least one embodiment." The term "a further embodiment" is to be read as "at least one further embodiment." The terms "first," "second," "third" and the like are only for distinguishing the objects referred to without limiting the order of these objects.

The electronic device, such as the memory and the like, usually consumes a large amount of electricity. Therefore, a plurality of power supply units are often used to supply power to the electronic device, and output currents of the plurality of power supply units need to be balanced. A plurality of methods for balancing the supply currents exist in the prior art, but these methods are complicated and suffer from high costs.

For example, a traditional method of balancing currents includes using an analog current sharing bus connected to all power supply units, in which only the power supply unit having the maximum output current drives the voltage level of the current sharing bus, while the other power supply units correspondingly change their output currents based on the voltage of the current sharing bus. The method requires a very complicated analog circuit, which is unstable and susceptible to bus noises.

For example, another traditional method of balancing currents includes using a communication current sharing bus connected to all power supply units, such as Internal Integrated Circuit (I.sup.2C) bus, Universal Asynchronous Receiver/Transmitter (UART) bus or Controller Area Network (CAN) bus. These buses transmit current sharing information with each other and correspondingly adjust the currents. The method requires a very intricate firmware design and a microcontroller with a high performance. Besides, the method acts slowly in response to sudden load changes, as it needs a large amount of time for intercommunication and adjustment.

Figure 1:
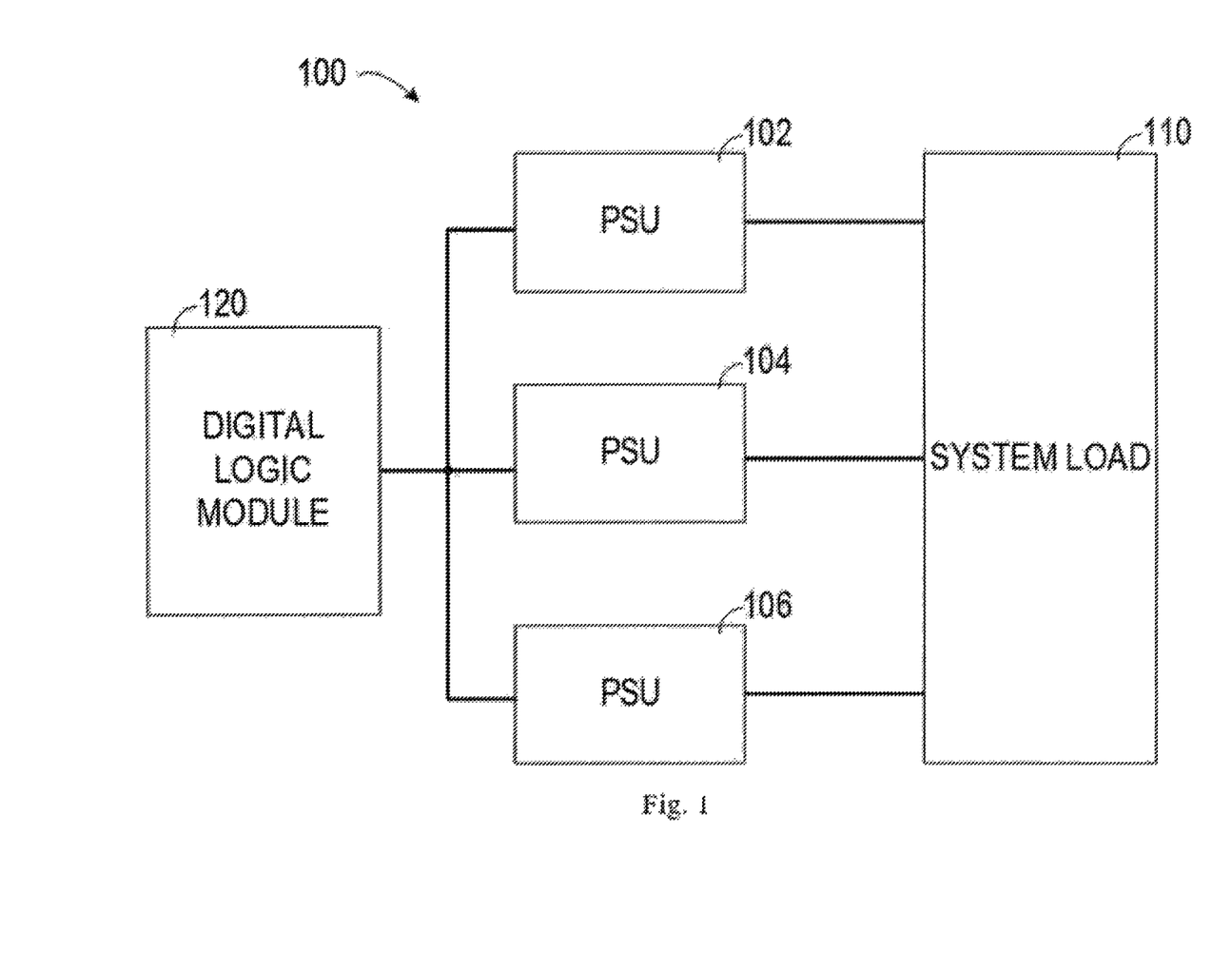
FIG. 1 is a simplified block diagram of a power supply system in which embodiments of the present disclosure can be implemented.

Embodiments of the present disclosure provide a method of balancing currents. The method uses a simple digital logic module, for example AND gate and OR gate, to balance supply currents of the plurality of power supply units without a big change to the power supply units. FIG. 1 illustrates a simplified block diagram of a power supply system 100 in which some embodiments of the present disclosure can be implemented. The power supply system 100 comprises a plurality of power supply units (PSUs) collectively supplying power to a system load 110, a digital logic module 120 and a system load 110. FIG. 1 illustrates three PSUs 102, 104 and 106. It can be understood that two or more PSUs can also be utilized. The PSU can be, for example, Uninterruptible Power Supply (UPS) or battery cell. From the perspective of a single power supply unit (for example the PSU 102), the power supply unit supplies power to the system load 110 via the single power supply circuit, whereas from the perspective of the system load 110, the system load 110 receives power from the plurality of power supply units via a plurality of power supply circuits. Correspondingly, from the perspective of the single power supply unit (for example the PSU 102), the power supply unit transmits, to a digital logic module 120, a signal representing a power supply state of the single power supply unit (such as the first signal described below), whereas from the perspective of the digital logic module 120, the digital logic module receives, from the plurality of power supply units, the signals representing the power supply states of the respective power supply units (such as a plurality of first signals), respectively. The digital logic module 120 may include AND gates and OR gates and be coupled to all PSUs. The system load 110 is an electronic device, such as a memory and the like. Besides, although the plurality of power supply units and the digital logic module are demonstrated as separated means, they can also be integrated in a single power source.

Figure 2:
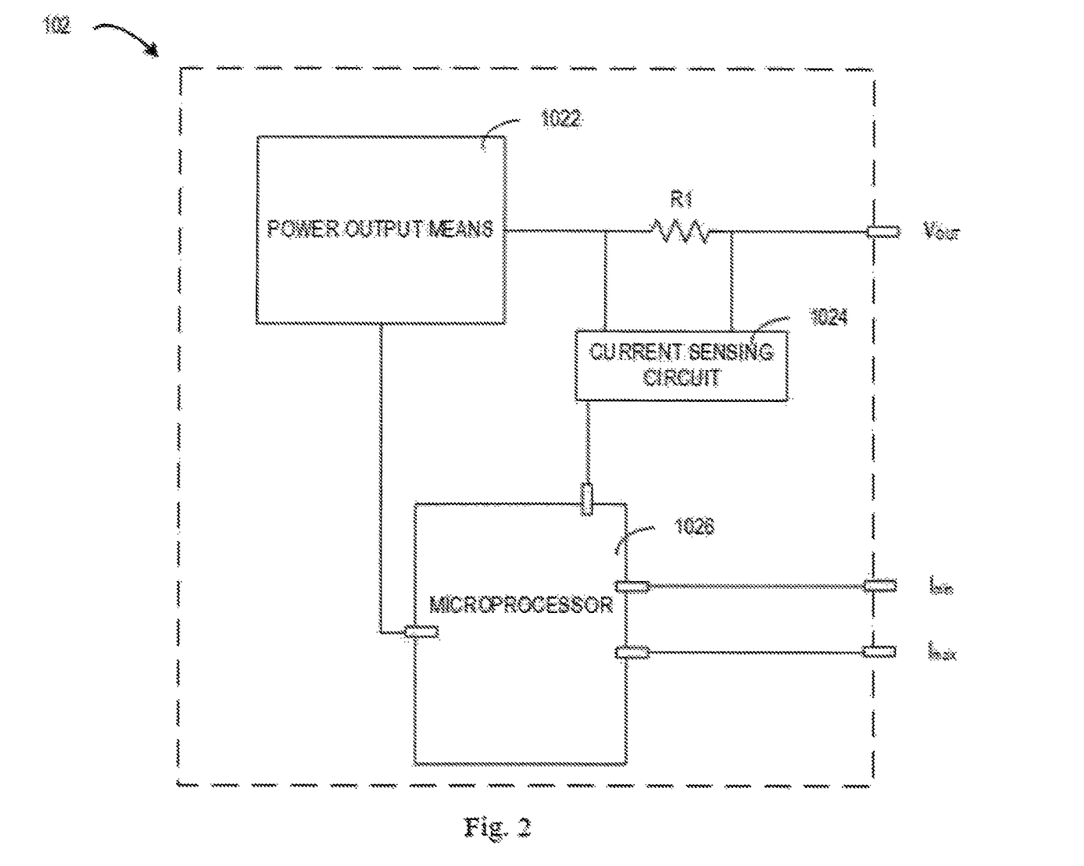
FIG. 2 is a schematic diagram of an example of a power supply unit in FIG. 1.

FIG. 2 illustrates a schematic diagram of an example of the PSU 102 in FIG. 1. It can be understood that the PSUs 104 and 106 have an essentially same or similar configuration as that of the PSU 102. The PSU 102 includes a power output means 1022, a resistor R1, a current sensing circuit 1024 and a microprocessor 1026. The power output means 1022 supplies power via the resistor R1 to the load at the port Vout. The current sensing circuit 1024 detects the voltage across the resistor R1 to determine the current flowing from the power output means 1022 and being provided to the load.

The microprocessor 1026 receives the voltage value across the resistor R1 and converts it into a pulse width signal representing the voltage value. In this context, each pulse width signal corresponding to the supply current value can be referred to as "the first signal" for the sake of discussion. It will be appreciated that, depending on the number of PSUs, there are a corresponding number of first signals. The microprocessor 1026 outputs via a port Imin or Imax a first signal to the digital logic module 120. Although outputting the first signal to the digital processing module 120 via the microprocessor 1026 has been shown, there may be other signal transmission methods as well. For example, the voltage across the resistor R1 is transmitted to the digital logic module 120 via other conversion means, or the current sensing circuit 1024 directly converts it into a pulse width modulation signal and directly transmits the pulse width modulation signal to the digital logic module 120.

The digital logic module 120 receives the first signals I_1, I_2 and I_3 from the PSUs 102, 104 and 106, and then performs logic "AND" and "OR" operations on the first signals I_1, I_2 and I_3, so as to determine the maximum supply current Imax and the minimum supply current Imin. In this context, the signal representing the maximum supply current Imax is referred to as "the second signal" and the signal representing the minimum supply current Imin is referred to as "the third signal." Then, the digital logic module 120 transmits the second signal and the third signal to each PSU.

The PSU receives the second signal and the third signal via the ports Imax and Imin, respectively. The microprocessor 1026 determines the average current based on the received second and third signals, and then controls (1022) the output current based on the average current and the current supply current. Although the port Imax or Imin is shown to bi-directionally transmit signals in a distributed mode, the microprocessor 1026 can also have a separate output port, which is different from the port Imax or Imin, to output the first signal to the digital logic module 120.

Figure 3:
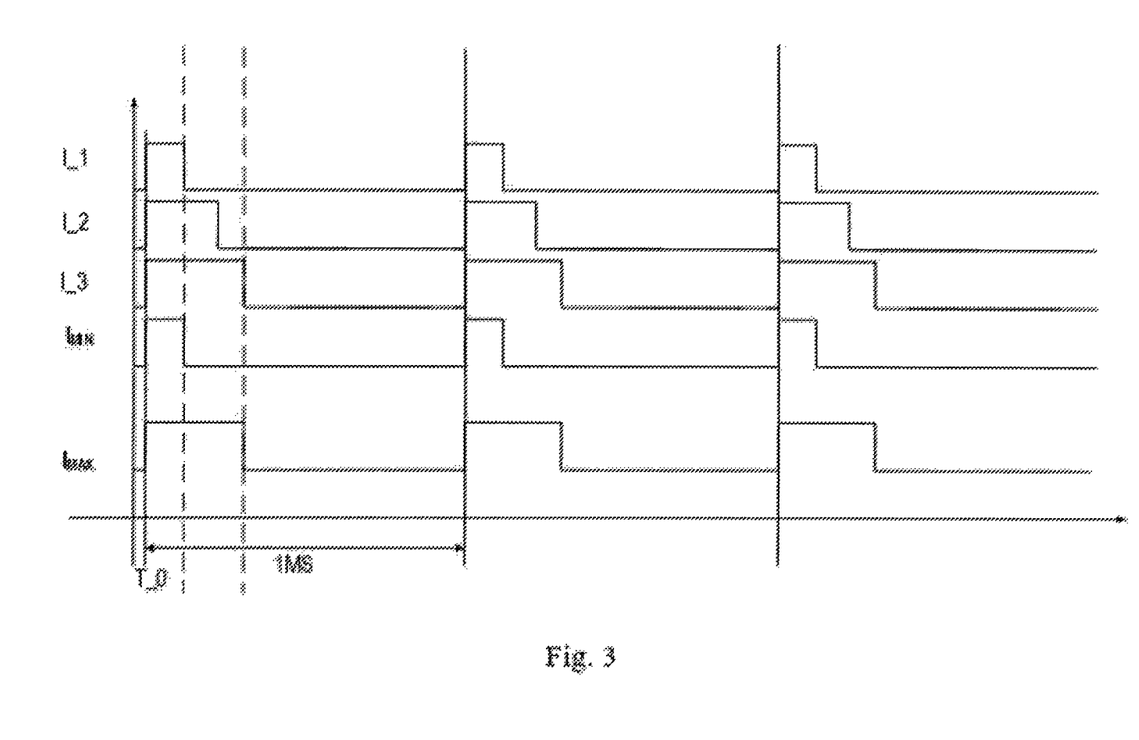
FIG. 3 illustrates a schematic diagram of waveforms of output voltages of components in FIG. 1.

FIG. 3 illustrates a schematic diagram of waveforms of output voltages of components in FIG. 1. As an example, the operations of the digital logic module 120 are described below with reference to FIG. 3. In FIGS. 3, I_1, I_2 and I_3 represent the first signal from the PSUs 102, 104 and 106, respectively. The first signal is a pulse width modulation signal and its width represents the magnitude of the supply current. It can be appreciated that the supply current can be detected at the same time, in order to obtain more accurate supply current information. For example, the first signals in the same cycle can be obtained using the clock in an interruptive manner. The digital logic module 120 performs logic AND and OR operations on the first signals from the PSUs 102, 104 and 106 in the same cycle (for example 1 ms is a cycle). Through the logic OR operation, the first signal having the minimum width (for example I_1) can be determined as Imin. Through the logic AND operation, the first signal having the maximum width (for example I_3) can be determined as Imax. The digital logic module 120 then transmits both the second signal Imax and the third signal Imin to the PSUs 102, 104 and 106.

Figure 4:
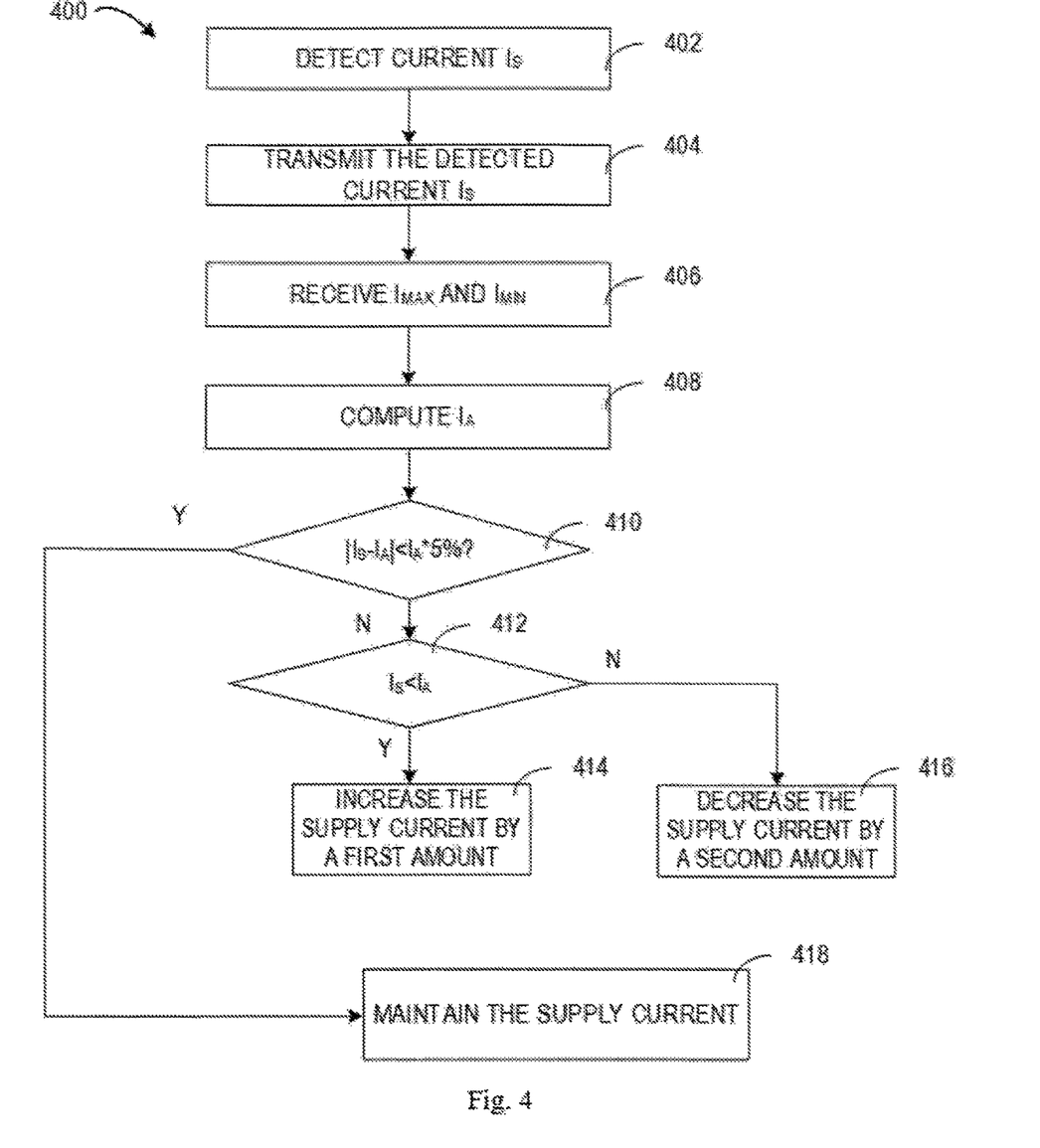
FIG. 4 illustrates a flowchart of a method of balancing currents according to embodiments of the present disclosure.

FIG. 4 illustrates a flowchart of a method 400 for balancing currents according to embodiments of the present disclosure. For example, the method 400 can be implemented by the PSUs 102, 104 and 106 in the power supply system of FIG. 1. At 402, the current sensing circuit 1024 detects the current supply current 402. The current sensing circuit 1024 transmits the detected voltage signal representing the supply current Is to the microprocessor 1026. The microprocessor 1026 then converts the voltage signal into a pulse width modulation first signal.

At 404, the microprocessor 1026 transmits the first signal to the digital logic module 120. As stated above, the digital logic module 120 performs logic operations on the first signals from the PSUs 102, 104 and 106 to determine the second signal and the third signal representing Imax and Imin.

At 406, the microprocessor 1026 in each PSU receives the second signal and the third signal representing Imax and Imin via the port Imax and Imin, respectively.

At 408, the microprocessor 1026 computes the average supply current signal Ia based on Imax and Imin, for example, the median of Imax and Imin can be determined as the average supply current. It can be understood that the above determination method is only an example and the average supply current can also be determined by other methods, for example each Is can be added up and the sum can be averaged to obtain the average supply current.

At 410, the microprocessor 1026 computes the absolute value of the difference between the current supply current Is and the average supply current Ia, and determines whether the absolute value is below a predetermined threshold, such as 5% of the average supply current. It can be appreciated that 5% is only an example and other percentage values can also be used, for example 1%, 2% or the like.

In response to the absolute value of the difference being below the predetermined threshold, for example below 5% of the average supply current, at 418, the output current of the power output means 1022 is maintained without adjusting the power output means 1022. That is, the current supply current serves as the subsequent supply current for providing to the load.

At 410, if the absolute value of the difference is below the average supply current by a certain percentage, at 412, whether the current supply current is below the average supply current is determined. If the current supply current is below the average supply current, at 414, the microprocessor 1026 increases the current supply current by a first current amount. For the power output means 1022, the current can be increased in various ways. For example, the microprocessor 1026 can increase the output voltage of the power output means 1022 by a first voltage amount (such as 50 mV) by adjusting the pulse modulation signals to the power output means 1022, such that the current supply current provided to the load is forced to be increased by a first current amount as the subsequent supply current.

If the current supply current is below the average supply current, at 416, the microprocessor 1026 decreases the current supply current by a second current amount. For the power output means 1022, the current can be decreased in various ways. For example, the microprocessor 1026 can decrease the output voltage of the power output means 1022 by a second voltage amount (such as 50 mV) by adjusting the pulse modulation signals to the power output means 1022, such that the current supply current provided to the load is forced to be increased by a second current amount as the subsequent supply current.

It can be appreciated that the flowchart in FIG. 4 is only an example and other methods can be used to control subsequent supply currents for the load. For example, the output voltage of the power output means 1022 is adjusted based on the current supply current and the average supply current. In an example, the output voltage adjusting amount is .DELTA.V=1*(Ia−Is)/Ia(V). For example, if Is=Ia*95%, the microprocessor 1026 increases the output voltage of the power output means 1022 by 50 mV. If Is=Ia*102%, the microprocessor 1026 decreases the output voltage of the power output means 1022 by 20 mV.

It will be appreciated that while an embodiment of the method of the present disclosure has been described according to the acts in the sequence of the flowchart, the acts of the embodiments of the present disclosure are not necessarily performed in the order described above. There may be some other combinations and sequences of the blocks.

Figure 5:
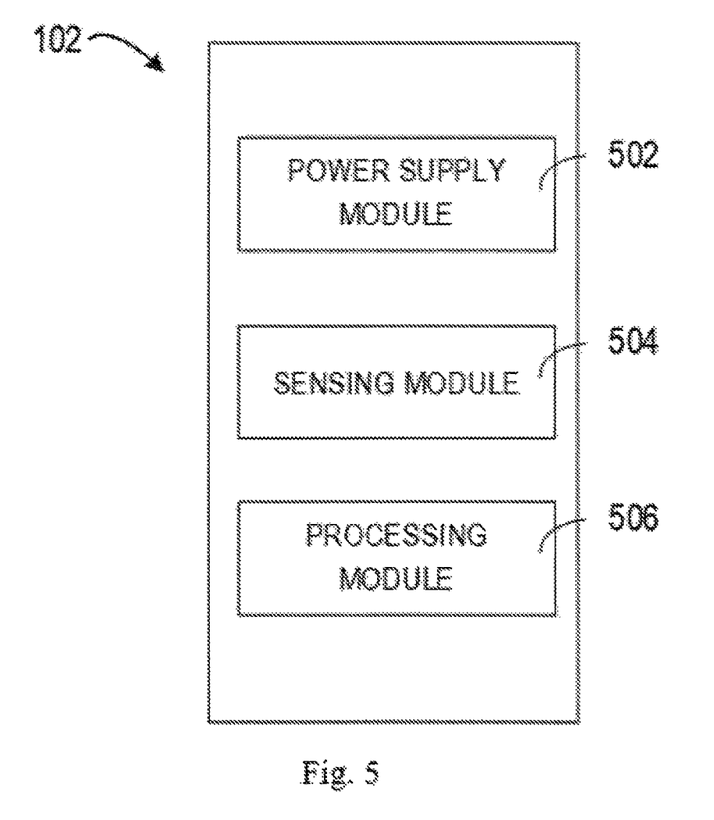
FIG. 5 illustrates a schematic block diagram of a power supply unit in FIG. 1.

FIG. 5 illustrates a schematic block diagram of an example of the power supply unit in FIG. 1. As shown, the power supply unit includes a power supply module 502, a sensing module 504 and a processing module 506. It can be understood that the PSU 102, PSU 104 and PSU 106 have essentially the same or similar configuration as that of the power supply unit. The power supply module 502 is configured to supply power to the load, such as memory and the like. The sensing module 504 is configured to sense the current supply current. The processing module 506 is configured to transmit a pulse width modulation signal representing the current supply current to an external digital logic module, receives the pulse width modulation signals representing the maximum supply current and the minimum supply current from the digital logic module, and determines the subsequent supply current provided to the load based on the current supply current, the maximum supply current and the minimum supply current. Features related to operations/functions of each module have been described above and will not be repeated here.

It will be appreciated the each module of the power supply unit shown in FIG. 5 can be implemented by hardware. For example, one or more of the above modules 502, 504 and 506 can be implemented as hardware modules, including but not limited to: Integrated Circuit (IC) chip, Application-Specific Integrated Circuit (ASIC) chip, System-On-Chip (SOC), Field Programmable Gate Array (FPGA) and the like.

Alternatively or additionally, some or all of the modules of the power supply unit can be implemented by software. For example, in one embodiment, the power supply unit can be implemented as a computer program product tangibly included in a storage medium accessible by the device and executed by the controller in the device.

Figure 6:
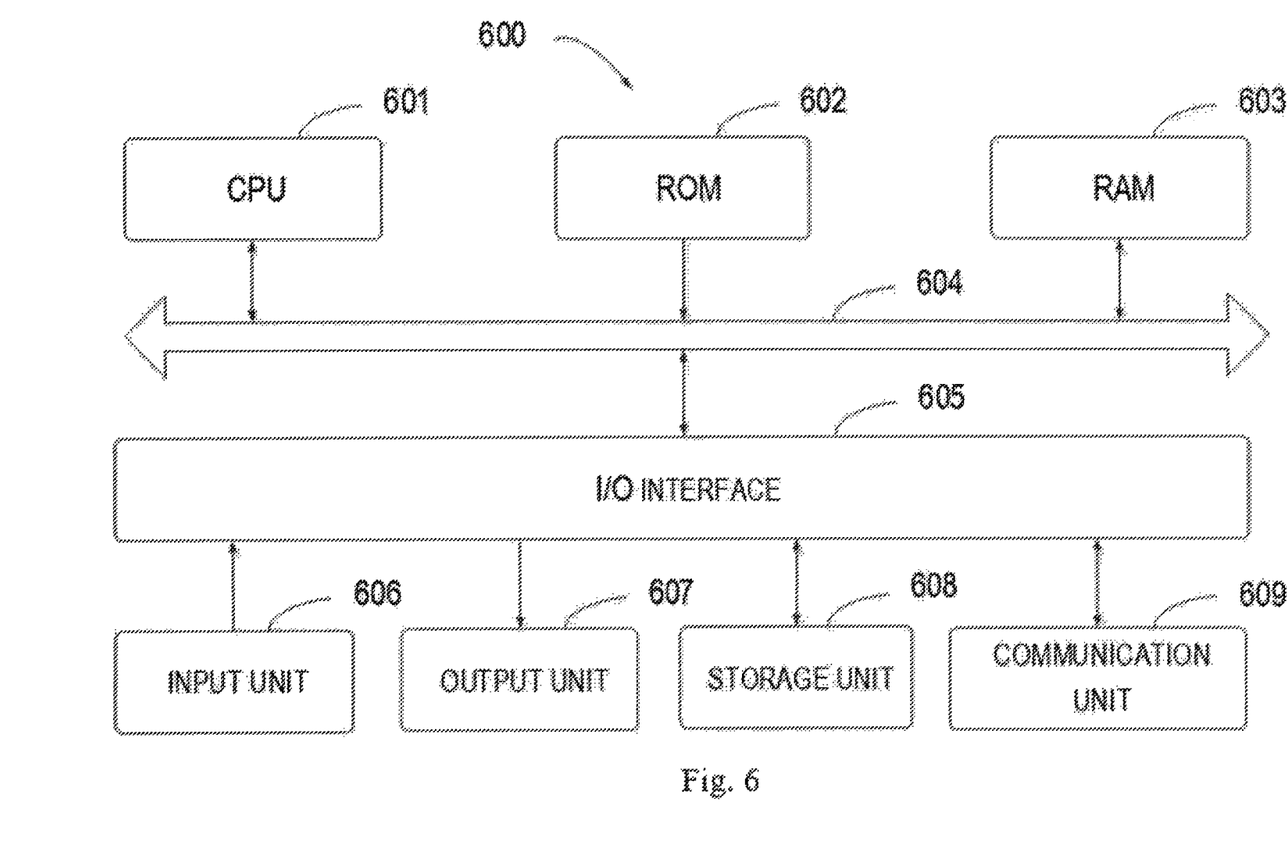
FIG. 6 is a schematic block diagram of a device for implementing embodiments of the present disclosure.

FIG. 6 illustrates a schematic diagram of a device 600 for implementing embodiments of the present disclosure. The device 600 can be the system 100 described above. As shown, the device 600 includes a central process unit (CPU) 601, which can act as the above described controller 610. The CPU 601 can perform various suitable acts and processing based on the computer program instructions stored in the read-only memory (ROM) 602 or the computer program instructions loaded into the random-access memory (RAM) 603 from the storage unit 608. Various kinds of programs and data required by the operations of the device 600 can also be stored in the RAM 603. CPU 601, ROM 602 and RAM 603 are connected to each other via a bus 604. The input/output (I/O) interface 605 is also connected to the bus 604.

A plurality of components in the device 600 are connected to the I/O interface 605, including: an input unit 606, such as a keyboard, a mouse and the like; an output unit 607, such as various kinds of displays and loudspeakers and the like; a storage unit 608, such as a disk and an optical disk and the like; and a communication unit 609, such as a network card, a modem, a wireless communication transceiver and the like. The communication unit 609 allows the device 600 to exchange information/data with other devices via the computer network, such as the Internet, and/or various telecommunication networks.

The device 600 also includes a plurality of batteries or PSU (not shown). A plurality of power supply device, such as the batteries and PSUs 102, 104 and 16, can be used for supplying power to the CPU 601, the ROM 602, the RAM 603, the input unit 606, the storage unit 608 and the communication unit 609.

Each procedure and processing described above, such as the method 400, can also be performed by the processing unit 601 besides the microprocessor 1026. For example, in some embodiments, the method 400 can be implemented as a computer software program tangibly included in the machine-readable medium, for example the storage unit 608. In some embodiments, the computer program can be partially or fully loaded and/or mounted to the device 600 via the ROM 602 and/or the communication unit 609. When the computer program is loaded to the RAM 603 and executed by the CPU 601, acts in one or more blocks of the above described method 400 can be implemented.

Generally speaking, various embodiments of the present disclosure can be implemented by hardware or dedicated circuit, software, logic, or any combinations thereof. Some aspects can be implemented by hardware while other aspects can be implemented by firmware or software, in which the firmware or the software can be executed by the controller, the microprocessor or other computing devices. Although aspects of the present disclosure is illustrated and described as block diagram and flow chart or represented using some other graphs, it should be understood that the block, device, system, technology or method described herein can be implemented by hardware, software, firmware, dedicated circuit or logic, universal hardware, or controller or other computing devices, or any combinations thereof in a non-restrictive manner.

Moreover, although the operations are described in a particular order, it should not be construed that these operations are required to be performed according to the sequence shown or in succession, or all operations shown are required to be performed to achieve a desired outcome. In some cases, multi-tasking or parallel processing can be beneficial. Likewise, although details of several implementations are included in the above discussion, they should not be interpreted as any restrictions on the scope of the present disclosure, instead, the descriptions of the features are only directed to the particular embodiments. Some features described in separate embodiments can also be implemented in one single embodiment in combination. On the contrary, various features described in a single embodiment can also be implemented in several embodiments separately or in any suitable sub-combinations.

Although the present disclosure has been described with specific structure features and/or method acts, it should be understood that the present disclosure defined in the attached claims does not necessarily restrict to the above described particular features or acts. The above described particular features and acts are disclosed only as example forms for implementing the claims.

What is claimed is:

1. A method of balancing a supply current, comprising:
transmitting, from a first power supply unit (PSU) to a digital logic circuit, a first output current signal representing a first output current of the first PSU for a system load;
receiving, from the digital logic circuit, an average output current signal representing an average output current, the average output current being an average of the first output current and at least one second output current of at least one second PSU for the system load; and
obtaining a subsequent output current of the first PSU for the system load based on the first output current and the average output current.

2. The method of claim 1 wherein the obtaining of the subsequent output current includes obtaining a difference between the first output current and the average output current, and obtaining the subsequent output current based on the difference.

3. The method of claim 2 wherein the obtaining of the subsequent output current includes, in response to the difference being less than a predetermined threshold, maintaining the first output current as the subsequent output current.

4. The method of claim 2 wherein the obtaining of the subsequent output current includes, in response to the difference being greater than a predetermined threshold and the average output current being greater than the first output current, increasing the first output current by a predetermined current amount, and using the increased first output current as the subsequent output current.

5. The method of claim 4 wherein the increasing of the first output current by the predetermined current amount includes increasing an output voltage for the system load by a predetermined voltage amount.

6. The method of claim 2 wherein the obtaining of the subsequent output current includes, in response to the difference being greater than a predetermined threshold and the average output current being less than the first output current, decreasing the first output current by a predetermined current amount, and using the decreased first output current as the subsequent output current.

7. The method of claim 6 wherein the decreasing of the first output current by the predetermined current amount includes decreasing an output voltage for the system load by a predetermined voltage amount.

8. A first device for supplying power, comprising:
a power output circuit configured to output a first output current of the first device to a system load;
a current sensing circuit configured to sense the first output current of the first device; and
a microprocessor configured:
to transmit a first output current signal representing the first output current of the first device to a digital logic circuit;
to receive, from the digital logic circuit, an average output current signal representing an average output current, the average output current being an average of the first output current of the first device and at least one second output current of at least one second device for supplying power to the system load; and
to obtain a subsequent output current of the first device for the system load based on the first output current and the average output current.

9. The device of claim 8 wherein the microprocessor is further configured to obtain a difference between the first output current and the average output current, and to obtain the subsequent output current based on the difference.

10. The device of claim 9 wherein the microprocessor is further configured, in response to the difference being less than a predetermined threshold, to maintain the first output current as the subsequent output current.

11. The device of claim 9 wherein the microprocessor is further configured, in response to the difference being greater than a predetermined threshold and the average output current being greater than the first output current, to increase the first output current by a predetermined current amount, and to use the increased first output current as the subsequent output current.

12. The device of claim 11 wherein the microprocessor is further configured to increase an output voltage for the system load by a predetermined voltage amount.

13. The device of claim 9 wherein the microprocessor is further configured, in response to the difference being greater than a predetermined threshold and the average output current being less than the first output current, to decrease the first output current by a predetermined current amount, and to use the decreased first output current as the subsequent output current.

14. The device of claim 13 wherein the microprocessor is further configured to decrease an output voltage for the system load by a predetermined voltage amount.

15. A power source, comprising:
the first device and the at least one second device for supplying power according to claim 8; and
the digital logic circuit configured:
to receive the first output current of the first device and the at least one second output current of the at least one second device;
to determine the average output current based on the first output current and the at least one second output current; and
to transmit the average output current signal representing the average output current to the first device and the at least one second device.

16. A method of balancing a supply current, comprising:
transmitting, from a first power supply unit (PSU) to a digital logic circuit, a first output current signal representing a first output current of the first PSU for a system load;
receiving, from the digital logic circuit, a median output current signal representing a median output current, the median output current being a median of the first output current and at least one second output current of at least one second PSU for the system load; and
obtaining a subsequent output current of the first PSU for the system load based on the first output current and the median output current.

17. The method of claim 16 wherein the obtaining of the subsequent output current includes obtaining a difference between the first output current and the median output current, and obtaining the subsequent output current based on the difference.

18. The method of claim 17 wherein the obtaining of the subsequent output current includes, in response to the difference being less than a predetermined threshold, maintaining the first output current as the subsequent output current.

19. The method of claim 17 wherein the obtaining of the subsequent output current includes, in response to the difference being greater than a predetermined threshold and the median output current being greater than the first output current, increasing the first output current by a predetermined current amount, and using the increased first output current as the subsequent output current.

20. The method of claim 17 wherein the obtaining of the subsequent output current includes, in response to the difference being greater than a predetermined threshold and the median output current being less than the first output current, decreasing the first output current by a predetermined current amount, and using the decreased first output current as the subsequent output current.

* * * * *